United States Patent [19]

Enz et al.

[11] Patent Number: 4,764,832
[45] Date of Patent: Aug. 16, 1988

[54] MAGNETIC TRANSDUCING HEAD HAVING CLAD CORE FACES

[75] Inventors: Ulrich E. Enz; Cornelis W. M. P. Sillen; Jacobus J. M. Ruigrok, all of Eindhoven, Netherlands

[73] Assignee: U.S. Philips Corporation, New York, N.Y.

[21] Appl. No.: 53,163

[22] Filed: May 21, 1987

Related U.S. Application Data

[63] Continuation-in-part of Ser. No. 924,232, Oct. 28, 1986, abandoned, and a continuation-in-part of Ser. No. 18,686, Feb. 25, 1987, abandoned.

[30] Foreign Application Priority Data

May 21, 1986 [NL] Netherlands .......................... 8601277
Jul. 3, 1986 [NL] Netherlands .......................... 8601732

[51] Int. Cl.$^4$ ............................................. G11B 5/235
[52] U.S. Cl. ..................................... 360/120; 360/126
[58] Field of Search ............... 360/119, 120, 122, 125, 360/126

[56] References Cited

U.S. PATENT DOCUMENTS 4,656,547 4/1987 Kumasaka .......................... 360/126

FOREIGN PATENT DOCUMENTS 55-129921 10/1980 Japan .
60-202502 10/1985 Japan .

*Primary Examiner*—A. J. Heinz
*Attorney, Agent, or Firm*—F. Brice Faller

[57] ABSTRACT

Magnetic transducing head comprising a magnetic core having two core limbs (1, 3) formed from a ferrite, a non-magnetizable gap (11) extending between two core faces (1B, 3B) of the core limbs and an electric coil (7) passing through a winding aperture (5). A cladding consisting of a first layer (13) of an Ni-Fe-based alloy is provided on at least one of the core faces, and a second layer (15) of an Fe-Si-Al-based alloy which is provided on the first layer.

8 Claims, 3 Drawing Sheets

MAGNETIC TRANSDUCING HEAD HAVING CLAD CORE FACES

This is a continuation-in-part of application Ser. No. 924,232, filed Oct. 28, 1986 and Ser. No. 018,686, filed Feb. 25, 1987, both now abandoned.

BACKGROUND OF THE INVENTION

The invention relates to a magnetic transducing head comprising a magnetic core having two core limbs formed from a ferrite, which core limbs have two core faces facing each other. At least one of the faces is provided with a cladding consisting of a layer of an Fe—Si—Al-based alloy, a non-magnetizable transducing gap extending between the core faces and a winding aperture with an electric coil passing therethrough and being provided around a core limb.

A magnetic transducing head of this type is known and described, inter alia in the publication IEEE 1984, September, Volume May 20, No. 5, pages 872–874, Analysis of Metal In Gap Heads, by J. J. M. Ruigrok.

The transducing heads which are used in present-day video recorders generally have an Mn—Zn ferrite core. Mn—Zn ferrite has a saturation magnetization of approximately 0.5 Tesla at room temperature, which is sufficient to comply with the requirements imposed by the registration on conventional video tapes, such as $CrO_2$-tapes with a coercive force Hc of approximately 56 kA/m. If, however, magnetic tapes having a higher coercive force such as Fe-tapes which have a Hc of roughly 80–160 kA/m are used for improving the quality of the video registration, such magnetic tapes can no longer be written satisfactorily. The magnetic fields generated by the transducing head at the area of the transducing gap for writing information on the magnetic tape are in fact limited by the relatively low saturation magnetization of the ferrite in the transducing head core. The strength of the writing field of the transducing head is therefore insufficiently high to ensure optimum writing of magnetic tapes with a high coercive force.

In the known transducing head defined in the opening paragraph the above-described problem is tackled by sputtering a layer of Fe—Si—Al on at least one of the core faces present on either side of the transducing gap. In fact, the Fe—Si—Al alloy sputtered on the core faces enhances the recording an reproducing characteristics of the transducing head. In addition Fe—Si—Al is a wear-resistant material so that hollow-out of the transducing head owing to moving a magnetic tape along the tape contact face of the transducing head can be mitigated.

A drawback of the known transducing head is that pseudo-gaps or side gaps are formed between the ferrite core limbs and the Fe—Si—Al layers so that constructive and destructive interferences causing troublesome oscillations in the frequency characteristic of the known transducing head may occur at the area of the interfaces between the core limbs and the Fe—Si—Al layers.

To reduce the detrimental effect of the occurrence of pseudo-gaps in magnetic heads with a ferrite core it has been proposed in the publication Digests of Intermag 85, April 29–May 2, USA, p. DA-1, A tilted sendust-sputtered ferrite video head, by T. Kobayashi, c.s. to position the faces in which the pseudo-gaps occur in such a way that the pseudo-gaps do not run parallel to the transducing gap, but constitute an angle with this gap.

A magnetic head in which this measure is used is indeed less subject to pseudo-gap effects, but a magnetic head of this type is rather complicated in its construction and difficult to manufacture from a technological point of view.

SUMMARY OF THE INVENTION

A layer of an Ni—Fe-based alloy is provided on the core face, the layer of an Fe—Si—Al-based alloy being provided on the layer of an Ni—Fe-based alloy. No pseudo-gaps are produced at the transition of the ferrite core limb to the layer of an Ni—Fe-based alloy, nor at the transition of the layer of an Ni—Fe-based alloy to the layer of an Fe—Si—Al-based alloy, which is also clearly evident from the favourable frequency characteristic of the transducing head in which perterbations caused by possible side gaps are not present.

The transducing head can be manufactured in a simple manner by known techniques in which the different layers are provided one after the other, for example by means of sputtering.

Such a transducing head has very good properties for writing information on high coercive registration media and can be manufactured in an economically attractive way. The cladding is provided on both core faces, whilst parallel gap boundary faces of equal width for defining the gapwidth of the transducing gap are formed, central core face parts parallel to the gap boundary faces extending between the core limbs and the claddings thereof. Oblique core face parts are at an angle with the central core face parts extending on either side thereof, the central core face parts having a width which is larger than half the width of the gap boundary faces.

The cladding may be considerably thinner than in the known magnetic heads as described, for example in European Patent Application No. 0,125,891 H. This has the advantage that the cladding can be provided without any complications on the core faces in accordance with known methods such as sputtering.

In an embodiment which is favourable from a manufacturing-technical point of view, the width of the central core face parts is at least substantially equal to the width of the gap boundary faces.

A further favourable embodiment is characterized in that on either side of the transducing gap between the core limbs and the claddings thereof there extend further core face parts contiguous to the oblique core faces and running parallel to the central core faces. This embodiment, which can be manufactured in a simple manner, is particularly interesting because after sputtering the transducing head does not need to be provided with recesses on either side of the transducing gap for the purpose of locally constricting the tape contact face.

Particularly favourable results can be achieved when the thickness of the cladding is defined by the relation:

$$D_1 \geqq 1/3 \cdot W_1(1 - M_f/M_b),$$

in which $D_1$ is the sum of the thicknesses of the layer of an Fe—Si—Al-based alloy and the layer of an Ni—Fe-based alloy, $W_1$ is the gapwidth, $M_b$ is the weighted saturation magnetization of the materials of the said layers and $M_f$ is the saturation magnetization of the ferrite. The weighted saturation magnetization is herein understood to mean:

$$M_b = (t_s \cdot M_s + t_p \cdot M_p)/D_1,$$

in which $t_s$ is the thickness of the layer of an Fe—Si—Al-based alloy, $M_s$ is the saturation magnetization of this layer, $t_p$ is the thickness of the layer of an Ni—Fe-based alloy and $M_p$ is the saturation magnetization of this layer.

Cladding may be provided on both core faces, whilst parallel gap boundary faces of equal width for defining the gapwidth of the transducing gap are formed, the core faces parallel to the gap boundary faces extending between the core limbs and the claddings thereof. The core faces have a width which is larger than the width of the gap boundary faces, whilst the claddings on either side of the transducing gap have side faces which extend from the gap boundary faces to the said core faces and which constitute an acute angle with the core faces.

A high efficiency and a frequency characteristic in which a side gap effect is hardly noticeable can be achieved with this transducing head. The particularly satisfactory measuring results are all the more surprising because the constructive measures used in the transducing head are completely in contrast with the prior art trend as described in EP No. 0,125,891.

In EP No. 0,125,891 a magnetic head is described whose core is coated on at least one side of the transducing gap with a thick cladding of a magnetic material having a higher saturation magnetization than the ferrite of the core. The cladding is at least substantially provided on two core faces obliquely positioned with respect to the gap boundary face formed by the cladding, which core faces are mutually positioned in such a way that a core face parallel to the gap boundary face is formed between the oblique core faces, which core face has a width which is at most equal to half the width of the transducing gap but which is preferably minimal. In fact, it is asserted that with an increasing width of the central core face there is such a side gap effect (contour effect) at the area of the transition between the core and the cladding that the frequency characteristic of the magnetic head is increasingly disturbed, whereas the side gap effect is hardly disturbing in the case of the smallest possible width of the core face or in the case of a total absence of the core face. However, the side gaps in the known magnetic head still yield magnetic potential losses and consequently signal losses.

The magnetic head described in EP No. 0,125,891 has thick claddings of the order corresponding to half the gapwidth of the magnetic head or half the trackwidth on the magnetic tape. Thick claddings have the drawback that they are difficult to provide and therefore require a complicated manufacturing technique. Moreover, a very narrow central core face located between the oblique core faces is difficult to realise with the conventional sawing techniques.

An additional advantage of the alternative main embodiment of the transducing head according to the invention is the absence of oblique core faces. In fact, the faces on which the claddings are provided need not be profiled, which simplifies the manufacture of the magnetic heads quite considerably. The side faces of the claddings can be formed by means of a laser technique known per se during which treatment the gap is also provided at the desired width.

The angle constituted by the said side faces with the core faces will preferably be approximately 45°, but good results have also been achieved with angles of between 20° and 70°.

The transducing head defined hereinbefore as an alternative main embodiment is preferably also characterized in that the thickness of the cladding is defined by the relation:

$$D_2 \geq 1/2 \cdot ((M_b/M_f \sin \alpha)^{1/2} - 1) W_2 \cdot \tan \alpha,$$

in which $D_2$ is the sum of the thicknesses of the layer of an Fe—Si—Al-based alloy and the layer of an Ni—Fe-based alloy, $W_2$ is the gapwidth, $M_b$ is the weighted saturation magnetization of the materials of the said layers, $M_f$ is the saturation magnetization of the ferrite and $\alpha$ is the angle between a side face and a core face.

It is to be noted that the thickness of the layer of an Ni—Fe-based alloy is preferably small with respect to the layer of an Fe—Si—Al-based alloy and does not essentially contribute to the thickness of the total cladding. Furthermore it is to be noted that for achieving the envisaged object it is unimportant that the material of one of the two layers of the cladding has a higher permeability than the material of the other layer.

The magnetic transducing heads shown in the figures are suitable for writing and reading magnetic tapes having high coercive forces.

DETAILED DESCRIPTION OF THE PREFERRED EMBODIMENTS

Figure 1:
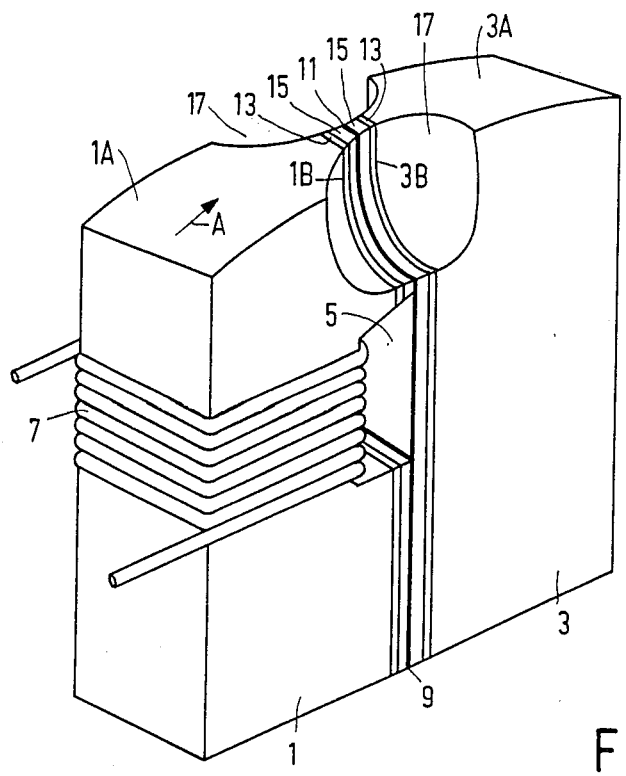
FIG. 1 is a diagrammatic perspective of a first embodiment of the magnetic transducing head.

The transducing head of FIG. 1 has a magnetic core consisting of two core limbs 1 and 3 and accommodating a winding aperture 5. The winding aperture 5 accommodates a portion of a coil 7 wound around one of the core limbs. The core limbs 1 and 3, which are formed from a ferrite, for example mono-crystalline Mn—Zn ferrite are fixed together by means of an adhesive layer 9 of a non-magnetic material such as glass or quartz. The core limbs 1 and 3 are provided with contact faces 1A and 3A, respectively, on which a magnetic tape (not shown) is moved in the direction of the arrow A during operation of the transducing head. Near the contact faces 1A and 3A the layer 9 constitutes a non-magnetic transducing gap 11 extending between the core limbs 1 and 3, which gap has a length of approximately 0.3 μm.

Core limbs 1 and 3 each have a completely flat core face 1B and 3B, respectively, facing the gap 11 on which faces a cladding consisting of two layers 13 and 15 is provided. The core faces 1B and 3B on either side of the transducing head are bounded by two recesses 17 which partly extend in the tape contact face constituted by the contact faces 1A and 3A and partly extend as far as the side faces of the transducing head. The layer 13 consists of an Ni—Fe-based alloy, such as $Ni_{80}Fe_{20}$, and is provided on the core faces 1B and 3B by means of, for example sputtering or vapour-deposition, whilst the layer 15 consists of an Fi—Si—Al-based alloy such as $Fe_{85.8}Si_{9.2}Al_{5.0}$ and is provided on the said layer 13 by means of sputtering, vapor-deposition or another process.

If the Ni—Fe-based alloy is provided by means of sputtering, a mixture of $Ar$—$N_2$ gas may be used during sputtering to increase the hardness of the sputtered alloy. The use of such a gas during sputtering is known per se and has been described, inter alia, in DE No. 3342533.

It has been found by experiment that favourable results can be achieved with layer thicknesses whose values are between 0.05 and 2.0 $\mu$m for layer 13 and between 1 and 10 $\mu$m for layer 15. These values are only examples because satisfactory results can also be achieved beyond the limits indicated.

The transducing gap, viewed widthwise, is at right angles to the direction of movement of the magnetic tape. Embodiments in which the transducing gap in the direction viewed is not oriented at right angles to the said direction of movement are of course also possible.

Figure 2A:
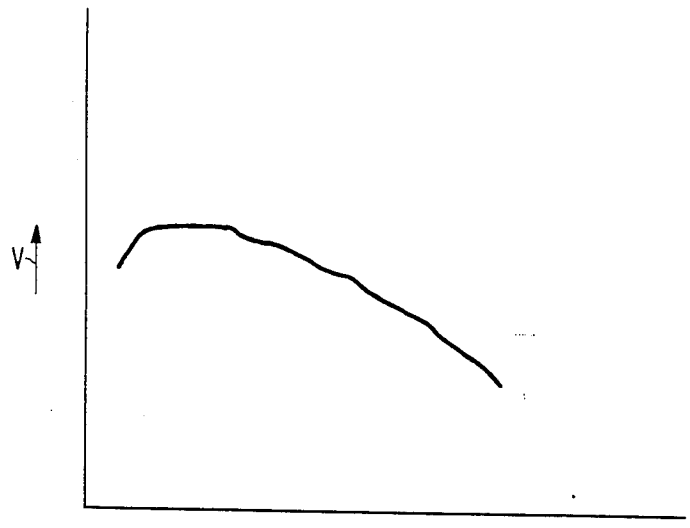
FIG. 2A shows the frequency characteristic of the second embodiment.
Figure 2:
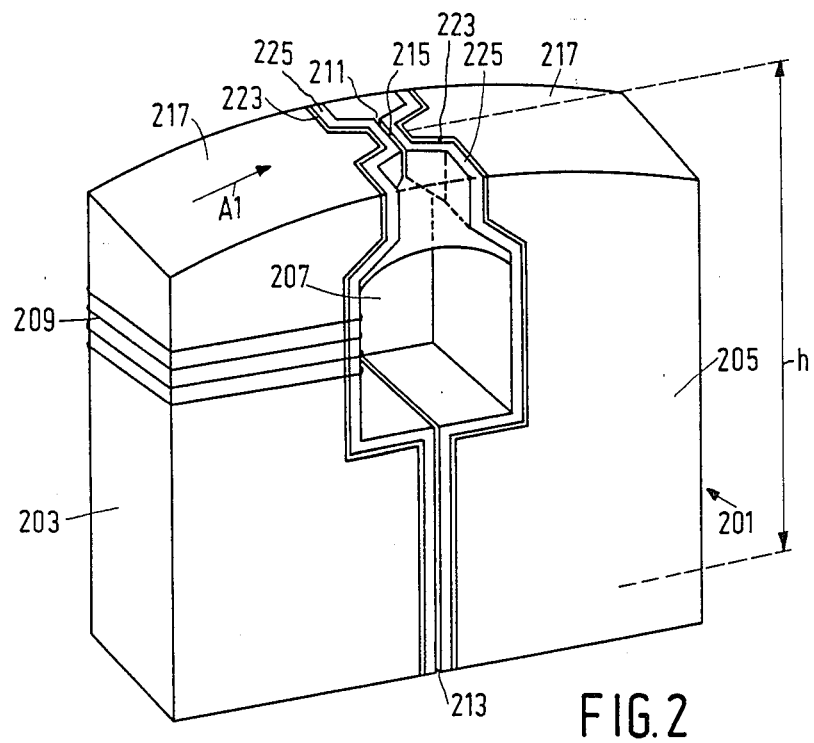
FIG. 2 is a perspective of a second embodiment.

The transducing head 201 shown in FIG. 2 is suitable for writing and reading magnetic tapes having a high coercive force. The transducing head 201 has a magnetic core consisting of two core limbs 203 and 205, which core is provided with a winding aperture 207 through which a coil 209 is wound. The core limbs 203 and 205, which consist of a mono-crystalline Mn—Zn ferrite, are sealed together by means of a sealing material, such as glass in the regions 211 and 213. In region 211 a transducing gap 215 is thus formed. The core limbs 203 and 205 have a tape contact face 217 along which a magnetic tape (not shown) is moved in the direction of the arrow A1 during operation of the transducing head 201.

Figures 3, 4:
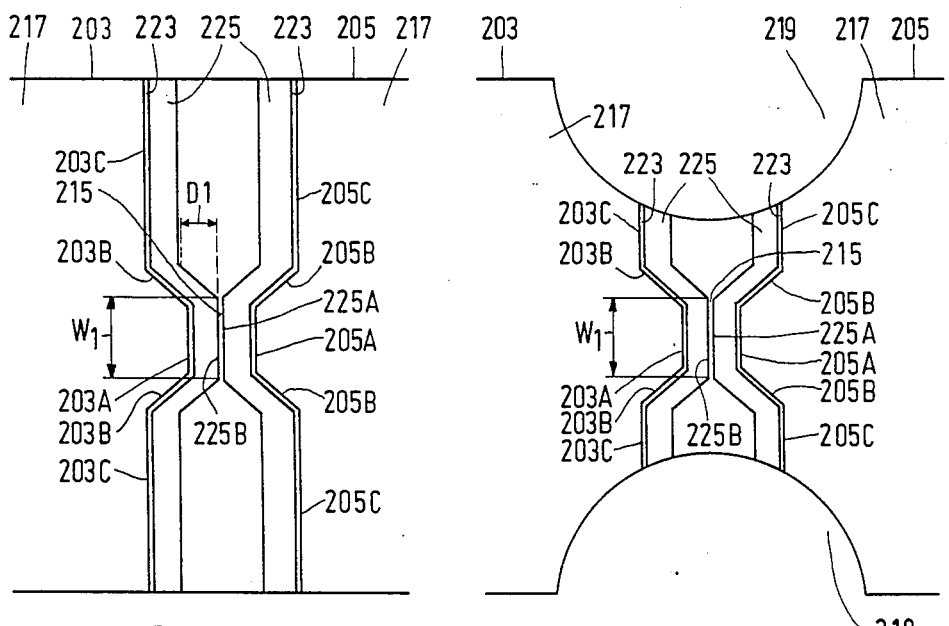
FIG. 3 is a plan view on a larger scale of part of the second embodiment.
FIG. 4 is a plan view on a larger scale of part of a transducing head in accordance with the second embodiment.

The visible parts of the transducing heads shown in FIGS. 3 and 4 have the same reference numerals as the parts of the transducing head according to FIG. 2 corresponding to the said parts.

As is shown in FIGS. 2, 3 and 4, claddings are provided on the core limbs 203 and 205. The cladding consists of a layer 223 of an Ni—Fe-based alloy and a layer 225 of an Fe—Si—Al-based alloy. The claddings constitute two parallel gap boundary faces 225A and 225B, respectively (see particularly FIGS. 3 and 4) of equal width. These gap boundary faces 225A and 225B define the gapwidth W1 of the transducing gap 15 which is filled with a non-magnetic material such as glass or quartz. The direction in which the gapwidth is defined as oriented, at least in these embodiments, at right angles to the direction of movement of the magnetic tape. Embodiments in which the said two directions are not at right angles to each other or of course also possible.

Central core face parts 203A and 205A are present between the core limbs 203 and 205 on the one hand and the claddings on the other hand, and on either side of these core faces and contiguous thereto there are provided oblique core face parts 203B and 205B constituting an angle with the central core face parts. The central core face parts 203A and 205A are almost equal to the width of the gap boundary faces. In the embodiments shown in FIGS. 2, 3 and 4 further core face parts 203C and 205C contiguous to the oblique core face parts are provided, which extend parallel to the central core face parts 203A and 205A. For supply of flux to the gap 215 at the tape contact face 217 it is favourable to cover not only the core face parts 203A, B, C and 205A, B, C at the area of the transducing gap with a layer of a magnetic material of the type described, but also the other face parts of the magnetic core adjacent the said core face parts and facing the transducing gap 215, so that the core limbs 203 and 205 are provided with a cladding on their sides facing the gap 215 over the entire height h. The claddings 223 and 225 may be provided during the manufacture of the transducing heads on the core limbs 203 and 205 by means of sputtering, electro-deposition, or vapour-deposition after the core faces have been formed by means of, for example, sawing. After the claddings 223 and 225 are provided, the core limbs 203 and 205 can be sealed together.

The magnetic head shown in FIG. 4 has undergone an extra processing treatment in which for the purpose of constriction of the tape contact face 217 in the neighbourhood of the transducing gap 215 two recesses 219 have been provided by means of, for example a laser.

For determining the thickness D1 of the cladding use can be made of the relation already given in the introduction to the description. In the embodiment according to FIG. 1 the thickness D1 is 3 $\mu$m. The gapwidth W1 is preferably smaller than 18 $\mu$m.

FIG. 2A shows the frequency characteristic with the output signal V as a function of the measuring frequency f of a transducing head of the type according to FIG. 2 whose cladding consist of a layer of an Ni—Fe-based alloy having a thickness of 0.5 $\mu$m and a layer of an Fe—Si—Al-based alloy having a thickness of 2.5 $\mu$m. It can clearly be seen that oscillations hardly occur in the frequency characteristic.

Figure 5:
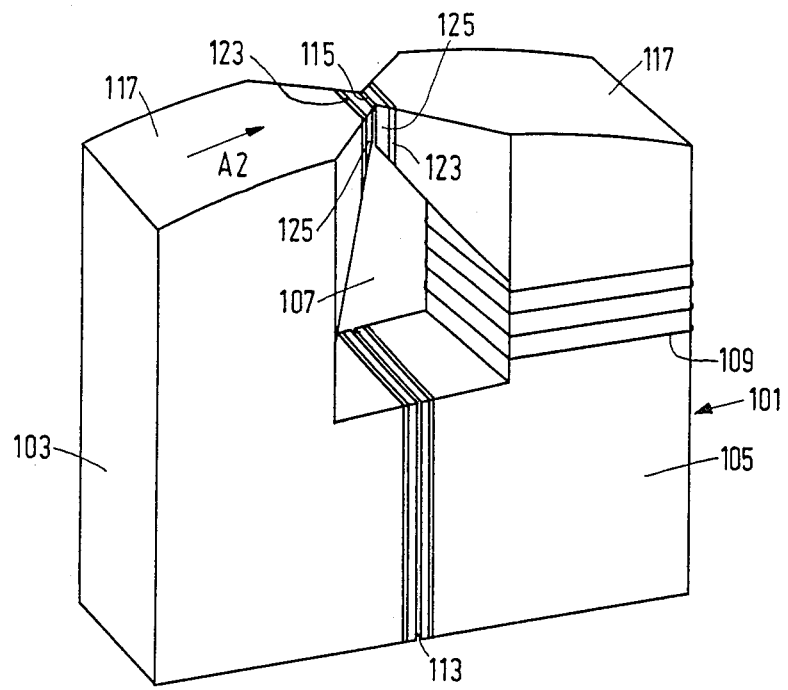
FIG. 5 is an elevational view of a third embodiment of the transducing head according to the invention.
Figure 6:
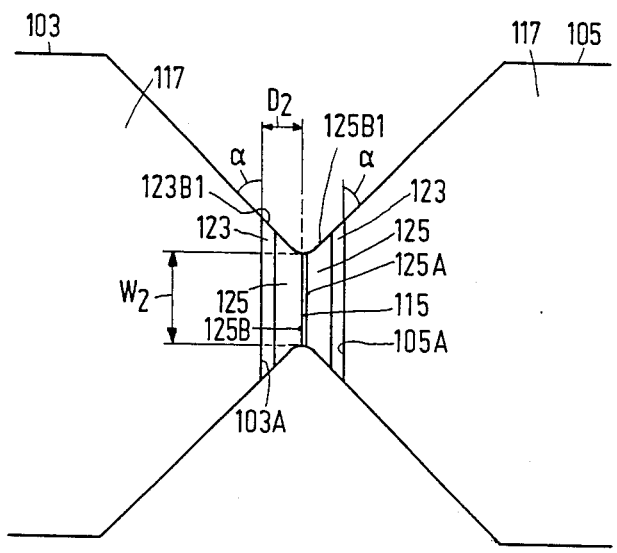
FIG. 6 is a plan view on a larger scale of part of the third embodiment.

The transducing head 101 shown in FIGS. 5 and 6 has principally the same properties as the transducing heads already described. The transducing head 101 has two core limbs 103 and 105 of ferrite which together form a magnetic core with a tape contact face 117 along which an information carrier can be moved in the direction shown by arrow A2 for magnetic co-operation with the transducing head 101. An electric coil 109 passing through a winding aperture 107 is provided around the core limb 105. The core limbs 103 and 105 which are connected together by means of a sealing layer 113 of, for example, glass each have a core face 103A and 105A, respectively. The core faces 103A and 105A face each other and run parallel to each other. A cladding composed of a layer 123 and a layer 125 is provided on each of the two core faces 103A and 105A. The layers 123 and 125 consist of an Ni—Fe-based alloy and an Fe—Si—Al-based alloy, respectively. The claddings 125 constitute a gap boundary face 125A and 125B, respectively of a predetermined width, with the direction in which the width is defined being at right angles to the direction denoted by the arrow A2 in this embodiment. The overall gap boundary faces bound a transducing gap 115 having a gapwidth W2. The transducing gap is formed by means of a layer of a non-magnetizable material such as quartz, which may also serve to seal the claddings 125 together.

In front of and behind the transducing gap 115 the two core limbs 103 and 105, respectively, are wedge-shaped, as viewed in the direction of the arrow A2, it being essential according to the invention that this wedge shape is also present in the claddings. This means that the claddings 123 and 125 have side faces 123B1 and 125B1, respectively, which constitute acute angles α with the core faces 103A and 105A, respectively. The side faces 123B1 and 125B1 of the claddings 123 and 125 as well as the further wedge shape of the core limbs may be realized, for example by means of known laser techniques. In this example angle α is equal to 45°. The sum, D2, of the thicknesses of the claddings 123 and 125 can be determined by means of the relation already mentioned in the introduction to the description.

In the latter embodiment in which the gapwidth W2 is 20 μm and the said angle α is 45°, 5 μm is a favourable value for the thickness D2.

We claim:

1. A magnetic transducing head comprising
a magnetic core having two core limbs formed from a ferrite, which core limbs have two respective core faces facing each other, at least one of said core faces being provided with a cladding consisting of a layer of an Fe—Si—Al-based alloy,
a non-magnetizable transducing gap extending between the core faces and
a winding aperture with an electric coil passing therethrough, said coil being provided around a core limb,
characterized in that the cladding provided on the core face also comprises an intermediate layer of an Ni—Fe-based alloy, the layer of an Ni—Fe-based alloy being provided on the core face and the layer of an Fe—Si—Al-based alloy being provided on the layer of an Ni—Fe-based alloy.

2. A magnetic transducing head as claimed in claim 1, characterized in that said cladding is provided on both core faces to form parallel gap boundary faces of equal width for defining the gapwidth of the transducing head, central core face parts parallel to the gap boundary faces extending between the core limbs and the claddings thereof, and oblique core face parts constituting an angle with the central core face parts extending on either side thereof, said central core face parts having a width which is larger than half the width of the gap boundary faces.

3. A magnetic head as claimed in claim 2, characterized in that the width of the central core face parts is at least substantially equal to the width of the gap boundary faces.

4. A magnetic head as claimed in claim 2, characterized in that further core face parts extend on either side of the transducing gap between the core limbs and the claddings thereof, which further core face parts are contiguous to the oblique core face parts and are parallel to the central core faces.

5. A magnetic head as claimed in claim 2, characterized that the thickness of the cladding is defined by the relation:

$$D_1 \geq 1/3 \cdot W_1(1 - M_f/M_b),$$

in which $D_1$ is the sum of the thicknesses of the layer of an Fe—Si—Al-based alloy and the layer of an Ni—Fe-based alloy, $W_1$ is the gapwidth, $M_b$ is the weighted saturation magnetization of the materials of the layers and $M_f$ is the saturation magnetization of the ferrite.

6. A magnetic transducing head as claimed in claim 1, characterized in that the cladding is provided on both core faces to form parallel gap boundary faces of equal width for defining the gapwidth of the transducing gap, the core faces parallel to the gap boundary faces extending between the core limbs and the claddings thereof, said core faces having a width which is larger then the width of the gap boundary faces, the claddings on either side of the transducing gap having side faces which extend from the gap boundary faces to said core faces and which constitute an acute angle with the plane of the core faces.

7. A magnetic head as claimed in claim 6, characterized in that said angle has a value of between 20° and 70°.

8. A magnetic head as claimed in claim 6, characterized in that the thickness of the cladding is defined by the relation:

$$D_2 \geq 1/2 \cdot ((M_b/(M_f \sin \alpha))^{1/2} - 1)W_2 \cdot \tan \alpha,$$

in which $D_2$ is the sum of the thicknesses of the layer of an Fe—Si—Al-based alloy and the layer of an Ni—Fe-based alloy, $W_2$ is the gapwidth, $M_b$ is the weighted saturation magnetization of the materials of the said layers, $M_f$ is the saturation magnetization of the ferrite and α is the angle between a side face and a core face.

* * * * *